Dec. 2, 1941.  H. L. REYNOLDS  2,264,889
CONCEALED SIGNATURE TRAVELER'S CHECK AND HOLDER THEREFOR
Filed Jan. 19, 1940
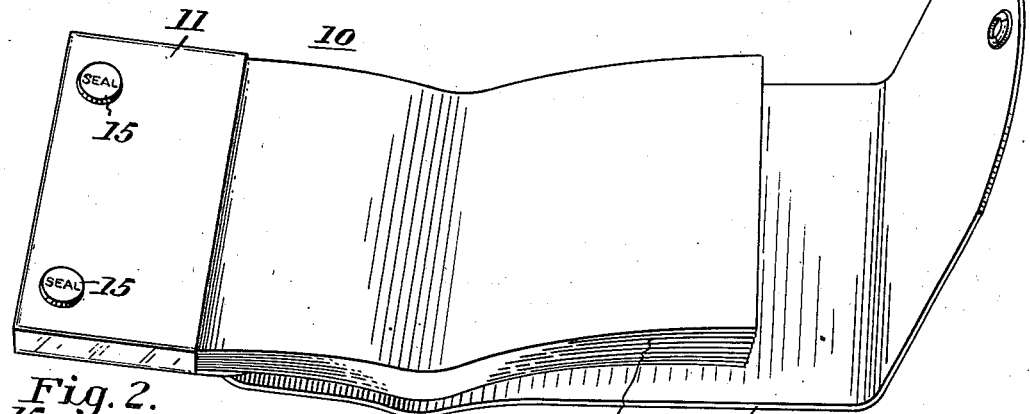
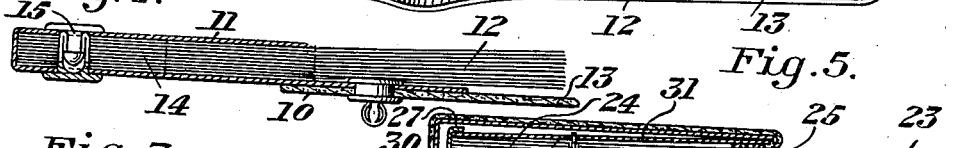
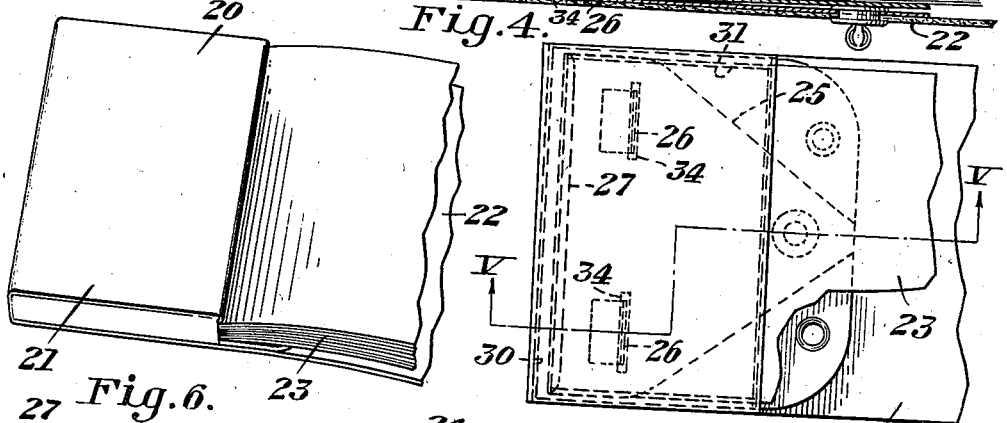
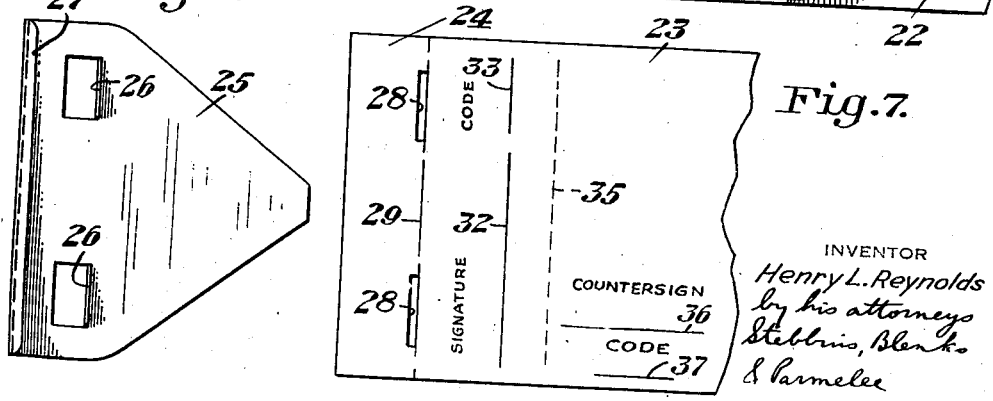
INVENTOR
Henry L. Reynolds
by his attorneys
Stebbins, Blenko
& Parmelee Patented Dec. 2, 1941

2,264,889

UNITED STATES PATENT OFFICE 2,264,889

CONCEALED SIGNATURE TRAVELER'S CHECK AND HOLDER THEREFOR

Henry L. Reynolds, Pittsburgh, Pa.

Application January 19, 1940, Serial No. 314,614

4 Claims. (Cl. 283—6)

This invention relates to a traveler's check and holder therefor so constructed and arranged that the purchaser's signature placed on the checks at the time of acquisition is at least partially, or preferably entirely concealed from view when the checks are placed in the holder, thus preventing a forger from practicing the signature so as to be able to counter-sign the checks with the appearance of authenticity and obtain cash for them.

Traveler's checks as ordinarily designed have a space whereon the purchaser signs at the time of buying the checks and a space for a counter-signature to be attached at the time of cashing the checks. In case the purchaser loses the checks, it is thus possible for the finder, if so inclined, to acquire by practice the ability to reproduce the purchaser's signature with sufficient appearance of genuineness to enable him to cash the checks. The present invention overcomes this objection to conventional traveler's checks by providing means for concealing the initial signature and making it impossible for a finder of lost checks to gain access thereto without detaching the checks from the holder, thereby rendering them void according to the rule of the issuing bank. I also provide an additional distinct identifying mark for each check so that it is impossible for a finder of lost checks to detach one check, practice the purchaser's signature and forge it on the remaining checks.

In a preferred embodiment of the invention, I provide a traveler's check having a stub from which it may be detached when counter-signed for cashing. Adjacent the stub I provide a space for the initial signature and identification mark. When initially signed and marked according to the identification code selected, the checks are inserted in a holder and permanently secured therein by their stubs. The holder is preferably in the form of a housing which conceals the original signature and identification mark. The purchaser is thus in a position to identify himself positively by counter-signing the checks in the presence of the cashier and supplying the necessary identification mark, before detaching the check from its stub. If the counter-signature and identification mark supplied by the holder of the check in the presence of the cashier are found on comparison to be identical with that initially applied, which is revealed only upon detachment of the check from the stub, the cashier is assured that the holder is entitled to the proceeds.

The following detailed description of a preferred embodiment of the invention and a modification thereof refers to the accompanying drawing. In the drawing—

Fig. 1 is a perspective view of one form of check-holder embodying the invention;

Fig. 2 is a longitudinal sectional view;

Fig. 3 is a partial view similar to Fig. 1 showing the preferred embodiment;

Fig. 4 is a partial plan view thereof;

Fig. 5 is a sectional view taken substantially along the plane of line V—V of Fig. 4;

Fig. 6 is a plan view of a clip adapted to receive the checks prior to their insertion in the casing of the holder; and Fig. 7 shows a portion of the face of a check embodying the invention.

Referring now in detail to the drawing and for the present to Figs. 1 and 2, the invention comprises a holder 10 including a casing 11 adapted to receive a plurality of traveler's checks 12. The holder includes a cover 13 of leather or similar material adapted to enclose the checks 12 when folded in the customary manner. The checks have stubs 14 from which they are detachable. The casing 11 and the stubs are suitably punched to receive rivets 15 effective permanently to bind the stubs in the holder.

It will be observed that the casing 11 conceals the portion of each check adjacent its stub. On this portion, I provide space for the initial signature of the purchaser and any selected code marking. Since a view of this space cannot be had until the checks are detached, the person to whom the check is presented is assured of the identity of the holder if the latter applies the proper counter-signature and code marking in the presence of the cashier before detaching the check from its stub when pulling it from the holder.

The manner of using the invention will be described more fully in connection with the preferred embodiment illustrated in Figs. 3 through 7.

Referring now to the preferred embodiment, a holder 20 including a housing 21 and a cover 22 secured thereto is adapted to receive a plurality of checks 23 having stubs 24. Before insertion of the checks into the housing 21, they are associated with a clip 25 having upstruck lugs 26 and a bent-over locking flange 27. The stubs 24 are punched as at 28 to receive the lugs 26 and are partially slit along the line 29 to facilitate detachment of the checks from the stubs.

The housing 21 like the housing 11 is in the form of a hollow box 30 open at one end. I have shown the cover 22 extending around and into the box to provide an attractive surface therefor, free from sharp corners, but this feature is optional. A spring tongue 31 extends into the box 30 from the outer edge of the open end thereof and normally tends to engage the opposite end of the wall of the box adjacent the closed end thereof.

When the checks have been initially signed by the purchaser on the line 32 and the selected code marking applied on the line 33, the clip 25 is placed under a bunch of checks with the lugs 26 extending through the slots 28 and the flange 27 overlying the free ends of the stubs 24. The assembled checks and clip are then inserted in the holder 21. The locking flange 27 displaces the spring tongue 31 until it reaches the closed end of the housing whereupon the tongue 31 is free to spring back and engage under the flange 27, as shown in Fig. 5. The tongue 31 has slots 34 to accommodate the lugs 26. With the tongue 31 in the position shown in Fig. 5, the lugs 26 positively prevent removal of a check with its stub.

It will be apparent that when the checks and clip are inserted in the holder, the latter covers the stub end of the face of the topmost check to about the dotted line 35, thus effectively concealing the initial signature and code marking. When the purchaser desires to cash a check, he counter-signs on the line 36 and applies the code marking on the line 37 in the presence of the cashier. The cashier then detaches the check from its stub and a comparison of the signatures and code markings will indicate to the cashier whether the proceeds may safely be paid to the holder.

Any convenient code may be used for the distinctive identification applied initially on line 33 and when cashing on line 37. Traveler's checks are ordinarily numbered serially. A convenient code of identification is thus afforded by adding to or subtracting from the serial number a chosen number. Alternatively, numbers or letters in certain predetermined sequences may be employed at the purchaser's option. It is preferable, of course, to choose a simple code in order that it may be remembered by the purchaser without the necessity of recording it.

It will be understood that the manner of using the embodiment of the invention shown in Figs. 1 and 2 is substantially the same as in the preferred embodiment except insofar as the attachment of the checks to the holder is concerned. In the case of the embodiment of Figs. 1 and 2, this is done by a suitable riveting press or fastener after the stubs of the checks have been disposed in the holder with their holes in alinement with those in the holder.

It will be apparent from the foregoing description and explanation that the invention provides a traveler's check and holder therefor having important advantages over those now in use, particularly in that the original signature of the purchaser is concealed so that in case of loss of the checks, it is not possible for a finder to practice the purchaser's signature and thereby perpetrate a forgery. The invention adds little to the cost of issuing traveler's checks as now carried on and the manner of using it is practically the same as that of the checks now employed except for the detachment of the check by the cashier, so that no substantial change in the habits of users of traveler's checks is involved.

Although I have illustrated and described a preferred embodiment of the invention with a modification, it will be understood that changes in the details of the invention as disclosed may be made without departing from the spirit thereof or the scope of the appended claims.

I claim:

1. The combination with a plurality of checks each having a stub portion from which it is detachable and an appropriately designated space adjacent said stub portion bearing the purchaser's initial signature, of a holder for said checks including a clip adapted to receive said stub portions and a housing in which said clip is insertible, said clip and housing being provided with cooperating spring tongue and locking means preventing their separation when the clip has once been fully inserted in the housing, and said housing being effective to conceal said space when the clip is fully inserted.

2. The combination with a pad of checks or the like, each having a stub portion from which it is detachable, and an appropriately designated space adjacent said stub portion bearing the purchaser's initial signature, of a housing adapted to receive the stub ends of said checks, and a clip having means adapted to make interlocking engagement with said stub portions and effective when inserted in said housing to prevent removal of the checks from the clip except by tearing them from said stub portions, said housing having means interlocking with said clip to prevent its removal therefrom when the clip is inserted therein, said housing being effective to conceal said signature when the checks are engaged with the clip and the clip is inserted in the housing.

3. The combination with a pad of checks or the like, each having a stub portion from which it is detachable, and an appropriately designated space adjacent said stub portion bearing the purchaser's initial signature, of a housing adapted to receive the stub ends of said checks, and a lug penetrating said stub portions effective when the checks are placed on the clip and the clip inserted in the housing, to prevent removal of the checks from the clip except by tearing them from said stub portions, said housing having a spring-locking tongue engaging said clip to prevent its removal when once inserted therein, said housing being effective to conceal said signature when the checks are assembled with the clip and the clip is inserted in the housing.

4. The combination with a pad of checks or the like, each having a stub portion from which it is detachable, and an appropriately designated space adjacent said stub portion bearing the purchaser's initial signature, of a housing adapted to receive the stub ends of said checks, and a lug penetrating said stub portions, effective when the checks are assembled with the clip and the clip inserted in said housing, to prevent removal of the checks from the clip except by tearing them from said stub portions, said housing having a spring-locking tongue engaging said clip to prevent its removal when once inserted, said tongue also having an opening through which said lug projects when the clip is inserted in the housing and said tongue interlocks therewith, said housing being effective to conceal said signature when the checks are assembled with the clip and the clip is inserted in the housing.

HENRY L. REYNOLDS.